Patented Aug. 5, 1930

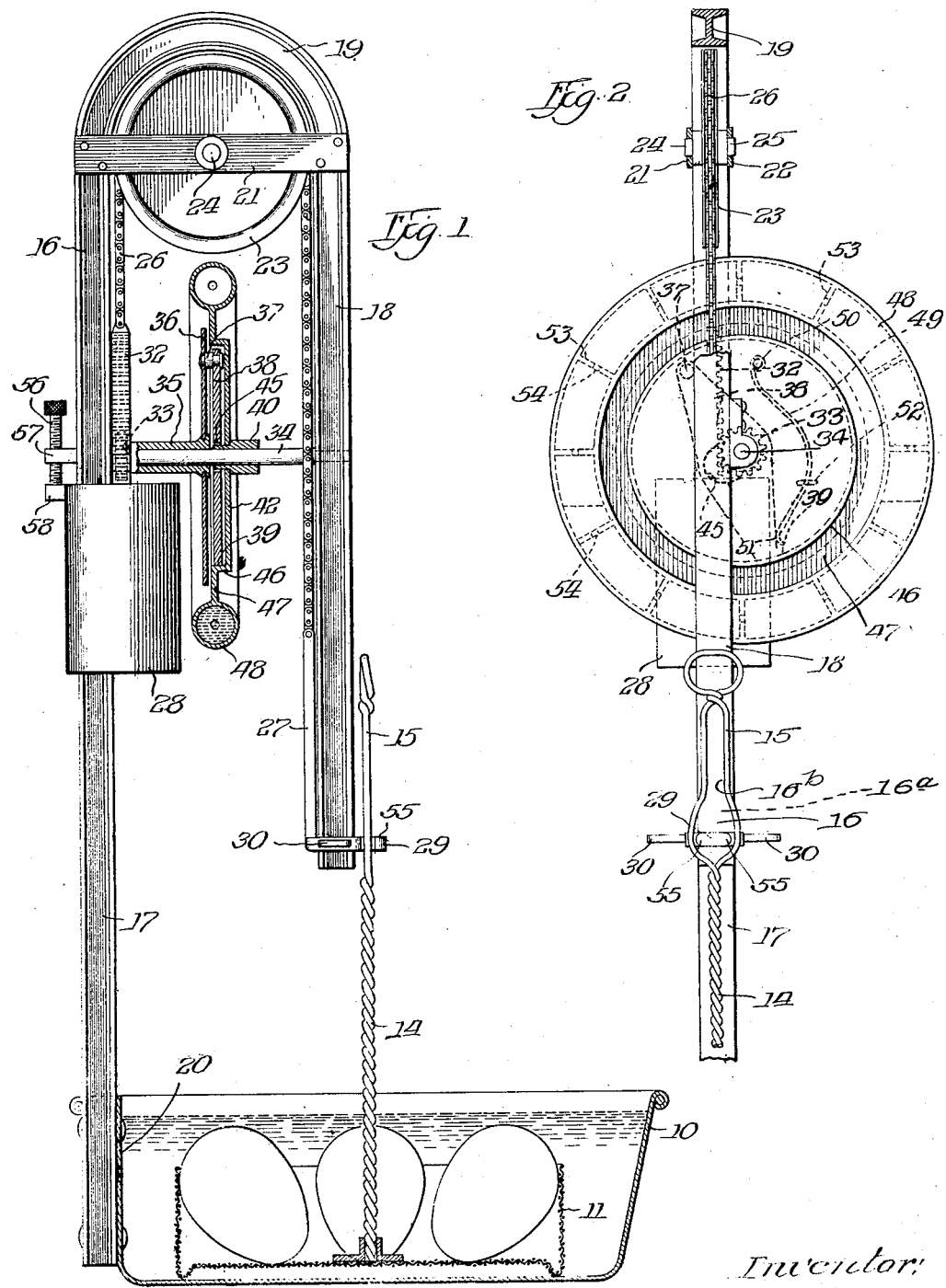

1,772,246

UNITED STATES PATENT OFFICE

WILL ESPY CURTIS, OF EVANSTON, ILLINOIS

TIMING MECHANISM

Application filed November 19, 1920. Serial No. 425,245.

My invention relates more generally to the automatic regulation of the movement of an element, and more particularly to regulating the time during which an object or substance is subjected to treatment, such, for example, as exposure to heat, chemical solutions or vapors, coating solutions, cooling solutions, etc., its object being to provide an apparatus and mechanism by which, for example, an object or substance being immersed, for instance, in a heated, cooled or coating liquid is at an appointed time withdrawn from the same without further attention on the part of the operator.

It comprises also an extension of the construction principle involved to an apparatus adapted to receive and care for in like manner any number of objects or substances with certainty of action and entire independence each of the other.

The applications of the invention in the arts are quite numerous and important—for example, the immersion of textile and other fabrics in dyeing solutions, subjection of products to chemical action of vapors or liquid solutions, treatment of food products, such as eggs, fruit and starchy substances by boiling water, immersion of substances such as food products in a cooling or coating solution, printing of photographs from negatives, and various other cases where time of immersion or treatment or the beginning or termination of a given condition is important to be observed.

In the present illustrations of my invention, I have selected its application to the coating of substances, and exhibit in the drawings an apparatus designed more particularly for use in connection with the coating of eggs, although as is obvious, the same apparatus illustrated could equally well serve for the boiling or cooling of eggs or other similar substances.

The principal objects of my present invention are, the provision of a device for chronometrically regulating the movement of a member; the provision of means for regulating chronometrically the treatment of substances; the provision of means for controlling the continuous movement of an element; the provision of means for raising material from a treating, and more particularly for raising said material by means of a regulated source of power; the provision of means for rendering active for raising material from a treating bath, of means moved by a regulated source of power; the provision of means for allowing the substances to be treated to move freely in one direction and at a predetermined rate of speed in the opposite direction; the provision with a lifting member operated from a regulated source of power of a material holding member freely separable therefrom; and the provision of an improved, simplified, easily constructed and efficient means for regulating chronometrically the treatment of substances, together with certain additional objects to be hereinafter pointed out.

In attaining these and other objects and advantages that will appear or that will be hereinafter set forth, I have provided a construction, one embodiment of which is illustrated in the accompanying drawings in which—

Figure 1 is a front view in section of an apparatus constructed in accordance with the present invention, and Figure 2 is a view of the same in section taken at an angle of 90° to that of Figure 1, the lower part being broken away.

The container, 10, which receives the treating liquid or bath is arranged to receive and support within it the holding member, 11, for the substances to be treated, which are illustrated as eggs.

Extending upwardly and preferably centrally from the bottom of the egg-holding member, 11, is the post or handle, 14, which widens out at its upper end, 15, to form a slot as shown at 16$^a$, for purposes to be hereinafter pointed out.

As a supporting standard for the lifting members and the chronometric mechanism, there is rigidly secured in any desired manner to the exterior of the container, 10, the channelled beam 16, preferably of I-form cross section, shown generally in the form of an inverted U, with its legs of different lengths, the longer leg, 17, being secured to the side of the container, 10, and the shorter leg, 18, depending substantially centrally of the container, 10, the two legs being connected by the substantially semi-circular portion 19.

To enable the beam 16 to be supported in substantially vertical position from the side of the container, 10, which slopes upwardly and outwardly, as shown in Figure 1, a portion, 20, thereof is positioned vertically as shown, and the lower end of the leg, 17, of the beam, 16, secured thereto. This beam, 16, forms the support for the chronometric regulator and the chronometrically centrally lifting member now to be described.

The upper end of the beam, 16, is provided on its opposite faces with the transverse bracing and supporting members 21 and 22, in which is rotatably mounted the grooved wheel, 23, by means of the journals 24 and 25 integral therewith. This grooved wheel, 23, is preferably made substantially of the same diameter as that of the inside of the upper curved portion, 19, of the beam, 16, and is positioned adjacent thereto, whereby a compact arrangement is secured.

The chain, 26, passes freely over the wheel, 23, and dependently carries from one end the hooked lifting member, 27, and from the other end the lifting counterweight, 28, the counterweight, 28, being guided in its movement by engaging about the leg, 17, as will be seen upon a comparison of Figures 1 and 2, and the lifting member, 27, being also guided in its movement by slidingly engaging the leg, 18.

The lifting member, 27, is moved downwardly manually, finger pieces 30, 30, being provided to facilitate this, and when released is moved upwardly by the action of the counterbalancing weight, 28.

The downward movement of the member, 27, is limited by the co-action between the counterweight, 28, and the variable "time-setting" device, hereafter described, which acts as a limiting stop.

For chronometrically controlling the upward movement of the member, 27, I have provided the chain, 26, with the rack bar, 32, which engages the pinion, 33, loosely mounted on the shaft, 34, extending transversely between and supported on the legs 17, 18 of the beam 16. Fixed at one end to the pinion, 33, in any desired manner, is a hollow shaft, 35, to the other end of which is secured the disc, 36. Pivoted to the disc, 36, on the pin, 37, and positioned adjacent the periphery thereof is the clutch member, 38, having its lower end, 39, curved along the arc of a circle of which the axis of rotation of the disc, 36, is the center. Fixed on the shaft, 34, is a hub, 40, carrying a disc, 42.

Viewing Figure 1, it will be observed that the discs 36 and 42 are arranged substantially parallel and are carried respectively from the hubs 35 and 40 rotating about a common axis, and that the clutch member, 38, straddles the hub 40. To permit this clutch member, 38, to swing freely about its pivot, 37, it is provided with the transversely extending slot 45.

The disc, 42, is provided with the circular flange, 46, extending therefrom toward the disc 36 and terminating adjacent thereto, and extending radially from the free end of said flange, 46, is the circular flange, 47, arranged substantially parallel to the disc 42 and carrying at its outer edge the tubular member, 48.

The dimensions and arrangement of the elements, 36, 38, 42 and 46 is such that the clutch lever, 38, is contained in what is substantially a cylindrical casing formed of two parts, the integral members 42 and 46 forming one end and side thereof and the disc, 36, forming the other end. The clutch lever, 38, and its end, 39, are so arranged and constructed that the lever end, 39, is brought into full engagement with the adjacent circular flange 46 when the lever, 38, occupies the relative position shown in Figure 2, in which position the distance from the pivot pin, 37, to any point on the end 39 of the lever, 38, is less than the distance from the pivot pin, 37, to the inner surface of the flange, 46, through the axis of rotation of the discs 36 and 42. For holding the lever, 38, and end, 39, in the relative position shown in Figure 2, the spring member, 49, is secured at one end to the pin, 50, carried by the disc, 36, and has its other free end, 51, in engagement with the clutch lever, 38, the intermediate portion of the spring, 49, being held by the staple 52 carried by the disc, 36. The spring, 49, thus normally tends to maintain the shoe in clutching engagement with the flange, 46, of the disc, 42.

From the description thus far given, it is obvious that when the disc, 36, is moved contra-clockwise (with reference to Figure 2) the co-action of the pivot pin, 37, slot, 45, and spring, 49, will be such as to cause the clutch end, 39, to engage and carry with it the disc 42. When on the other hand, the disc, 36, is moved clockwise (with reference to Figure 2) the co-action of these elements 37, 45 and 49 will cause the lever, 38, to swing to a position relatively diametrically of the disc, 36, and thus move the lever end, 39, thereof out of engagement with the flange, 46. The length of the slot, 45, is such as to prevent this swinging movement of the lever, 38, carrying the end, 39, thereof into engagement with the flange, 46, on the other side of a line through the pivot pin, 37, and axis of rotation of the disc 36.

The tubular member, 48, comprises a tube of uniform circular cross sectional area, bent round into circular form with its ends welded or otherwise secured together. Inside this tube, 48, are arranged diaphragms, 53, with apertures, 54, therethrough. The tube is partially filled with a liquid, preferably mercury, or a finely divided solid, such as sand. The purpose of this liquid or finely divided solid is to check the rotation of the disc 42. I prefer to fill the tube, 48, about two-fifths full of mercury which rests at the bottom of the wheel when the latter is at rest. The rotation of the disc, 42, produces a change in the position of the mercury owing to the fact that the mercury cannot flow with sufficient rapidity through the orifices, 54, in the diaphragms, 53, to keep the level of the liquid on both sides of the device substantially equal. Consequently, the level of the mercury on one side of the wheel becomes higher than that on the other until the head of mercury is sufficient to cause the mercury to flow through the tube at the same rate, but in the opposite direction to the rotation of the disc, 42. Evidently, the force required to rotate the wheel will increase with the height to which the mercury is drawn up on one side of the disc, 42, by rotation thereof. There will be a position of equilibrium between the driving force and the resistance to movement offered by the mercury corresponding to a certain speed.

The hooked shaped end, 29, of the lifting member, 27, extends through and beyond the slot, 16ª, a sufficient distance to engage in and rise through the slot 16ᵇ in the handle portion, 14, extending upwardly from egg holder, 11. When, therefore, the lifting member, 27, is moved upwardly, the portion, 29, thereof will be moved into engagement with the upper end, 15, of the handle, 14, and will thus cause the egg holder to move upwardly with the lifting member, 27. To prevent the handle, 14, moving to the side out of the engagement with the hook, 29, when the elements 29 and 15 engage, the portion 29 is provided with the outwardly extended portions, 55.

In the practical use of the apparatus described, the desired number of eggs are placed in the holder, 11. This can be done while the holder, 11, is removed from the container, 10, in which case the holder, 11, with the eggs therein is placed in the container, 10, with the portion, 29, of the lifting member, 27, in engagement with the slot, 16ª, in the handle, 14.

The lifting member may be previously or subsequently lowered in an obvious manner, thus, of course, pulling the chain, 26, clockwise about the grooved wheel, 23, this in turn causing the rack bar, 32, to move upwardly and with it the weight, 28. This upward movement of the rack, 32, will cause the pinion, 33, and with it the disc, 36, to rotate clockwise. As previously explained, this will move the clutch lever, 38, without producing any engagement between the shoe, 39, thereof and the flange, 46, of the governor disc 42.

Upon release of the member, 27, the weight, 28, will move downwardly, moving the rack bar, 32, in the same direction and moving the lifting member, 27, upwardly. This downward movement of the rack bar will, as previously explained, produce a contra-clockwise rotation of the disc, 36, upon which the shoe, 39, will engage the flange, 46, of the disc, 42, thus causing the discs 36 and 42 to move as a unit. The governor tube, 48, will then become effective to chronometrically control the continued upward movement of the member, 27.

Upon the continued movement of the parts, determined by the extent of the length of the rack, 32, acted upon by the pinion, 33, and after a predetermined interval upon the expiry of which the rack, 32, passes from engagement with the pinion, 33, the hook portion, 29, will engage the portion, 15, of the handle, 14, and lift the egg holder, 11, out of the container, 10. It is obvious that the length of the predetermined interval referred to is determined by the point to which the counterweight 28 is raised on the standard, 17, and consequently the length of the portion of the rack, 32, which engages with the pinion, 33.

For providing a time-setting device which also serves as a positive limit stop, the limiting point of which is adjustable, a screw, 56, is threaded through the lug, 57, fixed to the support, 16, with which engages a lug, 58, carried at the upper end of the counterbalance weight, 28.

By varying the position of the screw, 56, the time of immersion of the carrier, 11, in the container, 10, may be varied at will because the length of the travel of the member 29 before it engages with the upper end of the slot 16ᵇ is varied, thus varying the period of immersion of the eggs in the solution.

Having thus described my invention and illustrated its use, what I claim as new and desire to secure by Letters Patent is—

1. In a device of the character described, in combination, a container, a support carried by a side wall thereof having a leg spaced therefrom and depending substantially centrally of the container, and a lifting member movable upon and guided by said leg.

2. In a device of the character described, in combination, a container, a substantially U-shaped support carried by a side wall thereof having a leg depending substantially centrally of the container, and a lifting member slidable upon and guided by said leg.

3. In a device of the character described, in combination, a container, a substantially U-shaped support carried by a side wall thereof having a leg depending substantially centrally of the container, a lifting member guided by said support and a chronometrical governor for said lifting member positioned between the legs of said supporting member.

4. In a device of the character described, in combination, a carrier having a slot therein, a support above said carrier, a lifting member movable along said support and having a portion extending through and beyond said slot, said extending portion being adapted to engage and lift said carrier.

5. In combination, a support including spaced parallel legs, a carrier for holding a material to be treated, a weight operable upon one of said legs, a flexible connecting element between said weight and said carrier lying along said legs, one end of said connecting element having a lost motion connection to said carrier, and movement retarding means for said weight mounted on and between said legs and connected to said weight.

6. In combination, a support including spaced parallel legs, a carrier for holding a material to be treated, a weight operable upon one of said legs, a flexible connecting element between said weight and said carrier lying along said legs, one end of said connecting element having a lost motion connection to said carrier, movement retarding means for said weight on said support, means for connecting the weight for a limited part of its movement to said movement retarding means, and operable to release the weight to permit the latter to exert its full force for rapidly lifting said carrier by taking up the lost motion in said lost motion connection.

In testimony whereof, I have hereunto signed my name.

WILL ESPY CURTIS.